United States Patent [19]
Hattori et al.

[11] Patent Number: 4,940,937
[45] Date of Patent: Jul. 10, 1990

[54] PULSE GENERATING RING FOR ELECTROMAGNETIC ROTARY POSITION DETECTION

[75] Inventor: Kenji Hattori, Wako; Tsuneo Yamada, Kuwana, both of Japan.

[73] Assignees: Honda Giken Kogyo Kabushiki Kaisha, Tokyo; NTN Corporation, Osaka, both of Japan

[21] Appl. No.: 394,029

[22] Filed: Aug. 15, 1989

[30] Foreign Application Priority Data

Aug. 18, 1988 [JP] Japan .................................. 63-206528

[51] Int. Cl.⁵ ............................................... G01B 7/30
[52] U.S. Cl. ................................. 324/207.22; 324/173; 74/449; 310/155; 310/168; 29/513; 29/521
[58] Field of Search ................... 324/207, 208, 207.22, 324/160–179, 262; 310/168, 155; 74/434, 439, 446, 447, 448, 449, 457, 462; 29/521, 509; 513

[56] References Cited

U.S. PATENT DOCUMENTS

4,797,611 1/1989 Schreiber ........................ 324/173 X

*Primary Examiner*—Gerard R. Strecker
*Assistant Examiner*—Warren S. Edmonds
*Attorney, Agent, or Firm*—Armstrong, Nikaido, Marmelstein, Kubovcik & Murray

[57] ABSTRACT

A pulser ring has cylindrical inner and outer rings nested together. The inner ring is formed at its one end with protrusions arranged at equal angular intervals. The outer ring is in the shape of a round comb and has its teeth engaged at a portion near the tip thereof in the grooves defined between the adjacent protrusions formed on the inner ring. The tip of each tooth protruding from the grooves is bent radially inwardly so as to engage the end face of the protrusion on the inner ring, thus coupling the inner ring and the outer ring together.

1 Claim, 3 Drawing Sheets

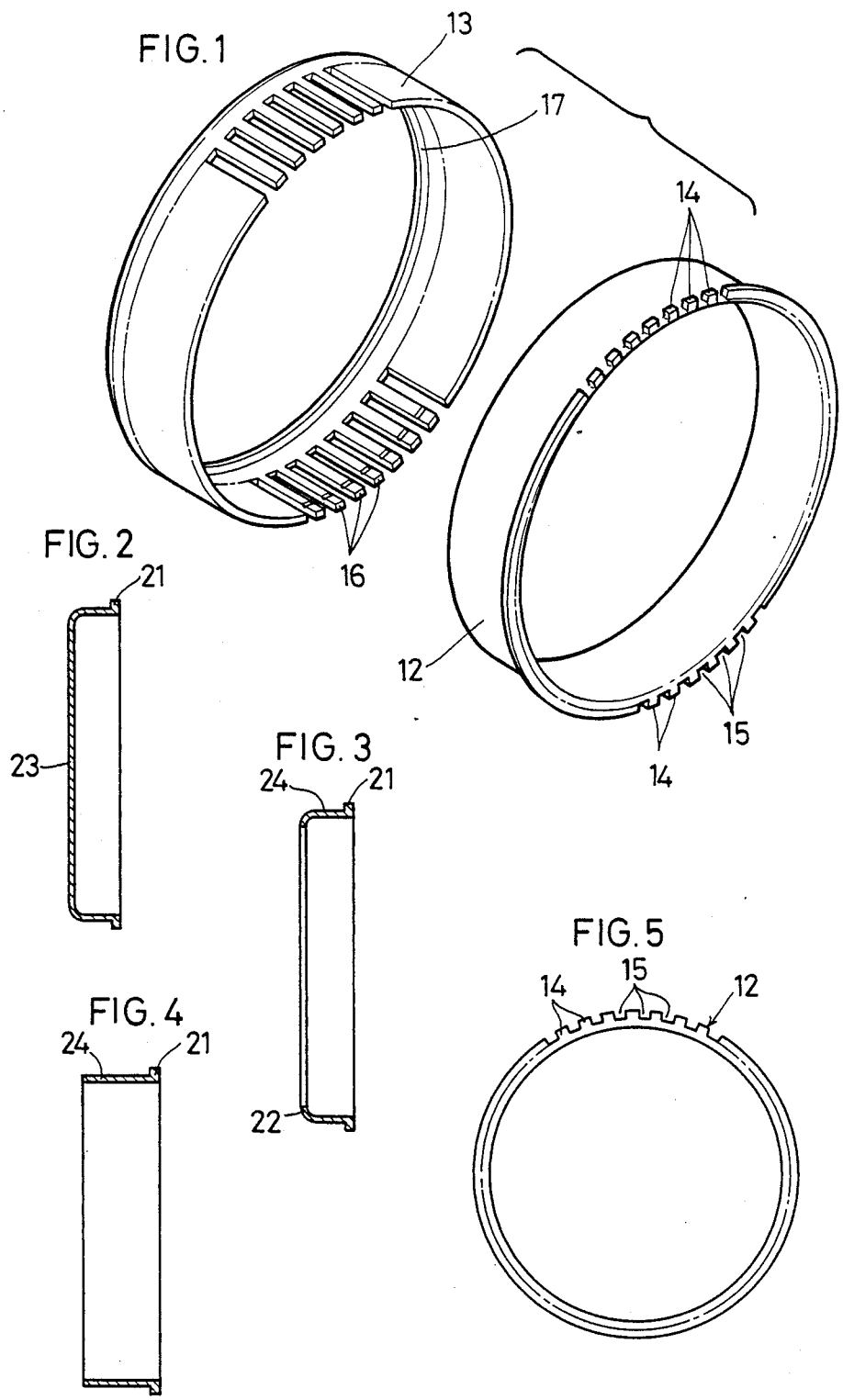

PULSE GENERATING RING FOR ELECTROMAGNETIC ROTARY POSITION DETECTION

The present invention relates to a pulser ring for detecting the number of revolutions of the front and rear wheels of an automobile to control it by an antilock brake system (hereinafter referred to as ALB) and the method for manufacturing the same.

The ALB is used to control the braking force according to the number of revolutions of the front and rear wheels of a car in order to prevent the wheels from locking and thus the car from skidding. Thus the ALB requires detector means for detecting the revolving speeds of the wheels.

FIG. 13 shows a prior art detector for detecting the number of revolutions of a wheel. It comprises a pulse gear 3 press-fitted on an outer ring 2 of a wheel bearing 1 at its end, and an electromagnetic sensor 4 arranged at a position opposite to the outer periphery of the pulse gear 3.

Such a prior art pulse gear 3 has been made of a steel material or a sintered ferrous alloy. Corrosion-resistant treatment may be applied to its surface if necessary. Such a prior art pulse gear is thick in a radial direction and is heavy in weight. Further, the material cost as well as production cost are rather high.

It is an object of the present invention to provide a pulser ring which obviates the above said shortcomings, which can be mass-produced, and which is inexpensive, compact in size and light in weight, and to provide a method for producing the same.

The inner ring and the outer ring pressed from a steel plate are coupled together so that the teeth on the outer ring will be received in the grooves formed between the adjacent protrusions formed on one end of the inner ring. Each tooth has its tip bent inwardly and pressed against the end face of the inner ring. This minimizes the height of the pulse ring in the radial direction. Also, since the teeth are arranged circumferentially at equal intervals owing to the provision of the protrusions, their pitch accuracy is high.

Further with this arrangement, the teeth of the outer ring can be held so rigidly as not to be deformed easily even if they are hit by stones and other foreign matter. Since the inner ring is located inside the teeth, the detection accuracy is improved. If the pulser ring is made of stainless steel, the teeth will be protected against the possible attack of rust on the mounting shaft.

Other features and objects of the present invention will become apparent from the accompanying drawings, in which:

FIG. 1 is an exploded perspective view of the pulser ring embodying the present invention;

FIGS. to 2 to 8 are explanatory views showing how the pulser ring according to the present invention is made;

Figure 6:
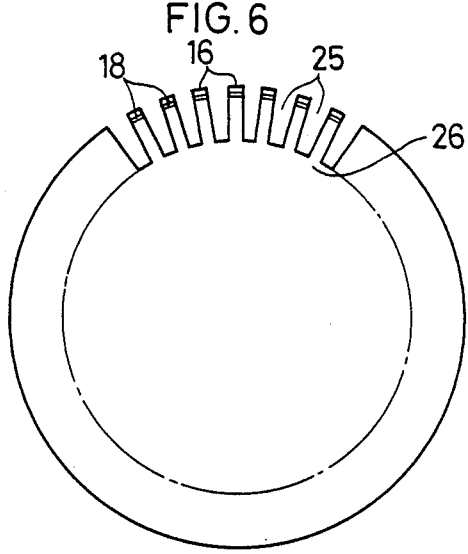

Now referring to FIGS. 1 and 2, the pulser ring 11 according to the present invention comprises an inner ring 12 and an outer ring 13. The latter has comb-like teeth and is adapted to be fitted over the inner ring 12. They are made by pressing separately of steel and coupled together.

The inner ring 12 is made of a corrosion-resistant magnetic stainless steel and shaped into a cylinder by pressing as shown in FIG. 1. Further it is formed at one end thereof with radially outwardly extending protrusions 14 formed by pressing. Grooves 15 are defined between the adjacent protrusions 14.

The outer ring 13 is made of the same material as the inner ring 12 and is formed with a plurality of axial teeth 16 arranged in a circumferential direction at equal intervals. Its end at the opposite side of the teeth 16 is bent inwardly to form a flange 17. Each tooth 16 is formed in its inner surface near its tip with a transverse notch 18. The teeth 16 are adapted to be bent along the notch 18 for caulking. The outer ring 13 is also formed mainly by pressing.

Each protrusion 14 on the inner ring 12 has a width substantially equal to the distance between the adjacent teeth 16. Each groove 15 formed between the adjacent protrusions 14 has such a width that the respective teeth 16 of the outer ring 13 can snugly fit thereinto.

FIGS. 2 to 5 show the process for manufacturing the inner ring 12. First as shown in FIG. 2, a circular plate is drawn into a cup having a flange 21 extending radially outwardly. The bottom 23 of the cup thus formed is punched out so as to leave only its peripheral portion as a radially inwardly extending flange 22 as shown in FIG. 3. The flange 22 is spread by use of a jig until it is flush with a cylindrical portion 24 of the cup (FIG. 4). Finally, the flange 21 is punched to form the grooves 15. The inner ring 12 thus made is shown in FIG. 5.

Figure 7:
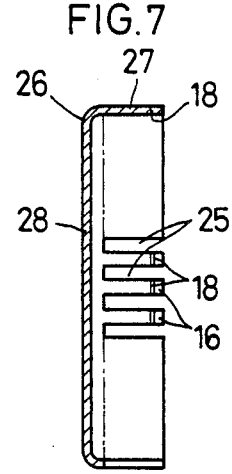
Figure 8:
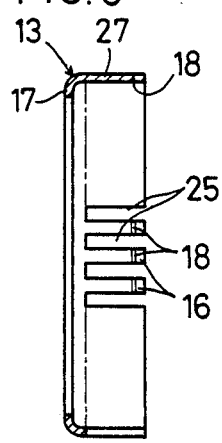
Figure 9:
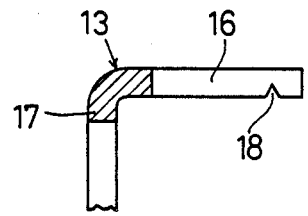
FIG. 9 is an enlarged sectional view of the tip of one of the teeth formed on the outer ring.

FIGS. 6 to 9 show the process for manufacturing the outer ring 13. First as shown in FIG. 6, a plurality of grooves 25 are formed along the periphery of a circular plate at equal angular intervals by punching to form the teeth 16. Then the V-shaped notch 18 is formed in each tooth 16 at its tip. The teeth 16 are bent at their base portion 26 by 90 degrees to form a cylindrical wall 27. The plate is thus formed into a cup having a bottom 28 (FIG. 7). Finally the bottom 28 is punched off, leaving an annular flange portion 17. The outer ring 13 thus made is shown in FIGS. 8 and 9.

The inner ring 12 and the outer ring 13 are inserted in a supporting die (not shown) one after the other so that the leading end of the inner ring 12 will abut the flange 17 on the outer ring 13 and the tip of each tooth 16 will be received in the respective groove 15 formed between the adjacent protrusions 14.

The inner ring 12 and the outer ring 13 may be coupled together before inserted in the supporting die.

Figure 10:
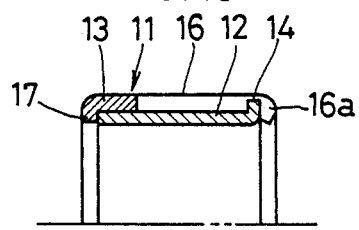
FIG. 10 is a partial vertical sectional view of the pulser ring of FIG. 1.

After inserting both rings into the supporting die, a male press die is forced into the supporting die to bend or caulk the tip of the teeth 16 inwardly against the end face of the inner ring 12 at the side of the protrusions 14 to assemble the pulser ring 11 as shown in FIG. 10.

Figure 11:
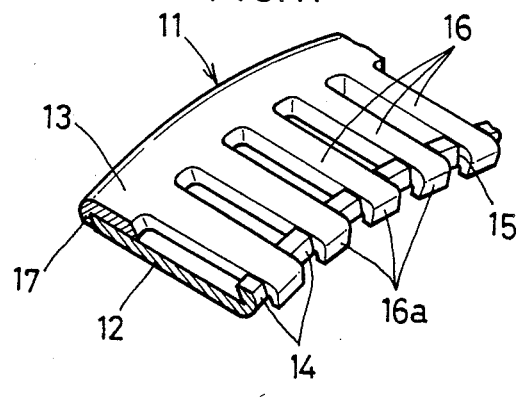
FIG. 11 is a perspective view of a portion of the same.

As shown in FIGS. 10 and 11, the inner ring 12 and the outer ring 13 are thus rigidly coupled together into the pulser ring 11 with the leading end of the inner ring 12 in abutment with the flange 17 on the outer ring 13 and the tip or caulking portion 16a of each tooth 16 of the outer ring 13 bent along the V-shaped notch 18 to extend inwardly. Further, since the teeth 16 have their tip fitted in the grooves 15 formed between the adjacent protrusions 14 on the inner ring 12, the two rings are coupled together rigidly.

The teeth 16 of the outer ring 13 are formed first by punching a single plate into a circular shape having a plurality of radial projections formed along its periphery and then by pressing the projections into a cylindrical shape. The teeth 16 are held in position at their tip by the protrusions 14 on the inner ring 12. Thus the rings 12 and 13 are restrained from moving relative to each other in the circumferential direction and the teeth 16 can maintain its high pitch accuracy.

The inner ring 12 and the outer ring 13 may be punched from a single plate at a time so that they are integral with each other. After folding them to overlap one upon the other, the inner ring 12 and the outer ring 13 may be pressed into cylinders so that they are nested together with the tip of each tooth 16 bent and overlying the end face of the inner ring 12.

Figure 12:
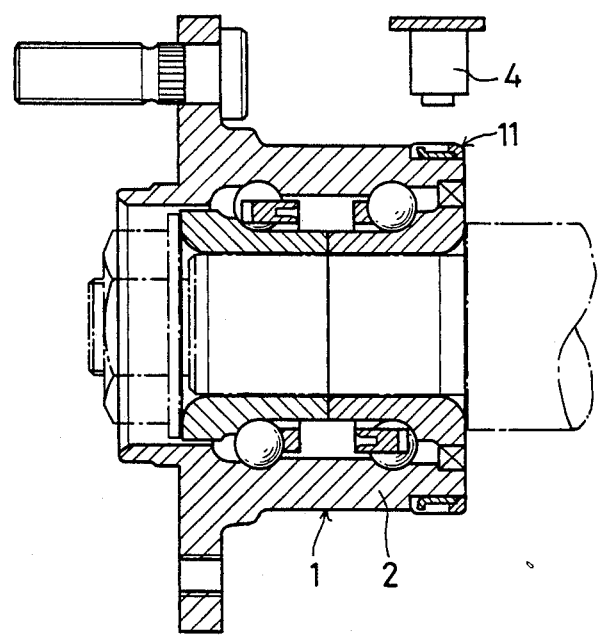
FIG. 12 is a vertical sectional view showing how the same is used.
Figure 13:
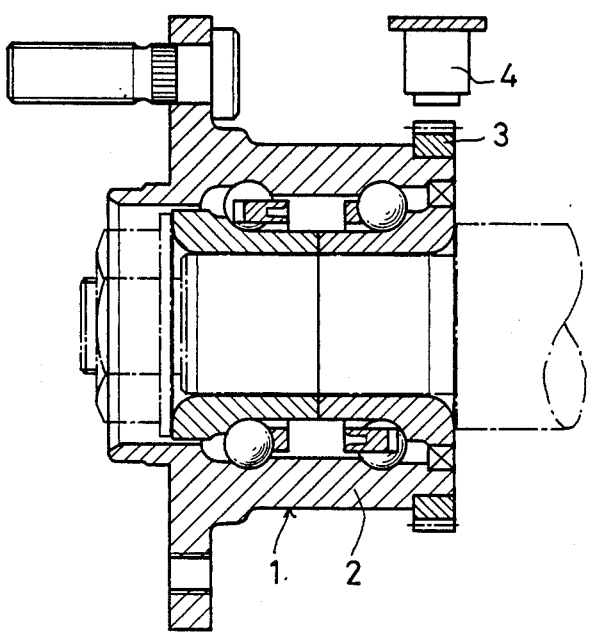
FIG. 13 is a similar view of a prior art pulser ring in use.

The pulser ring 11 thus made is press-fitted on a wheel bearing 1 around an outer ring 2 at its end as shown in FIG. 12. An electromagnetic sensor 4 is provided at a position opposite to the outer periphery of the pulser ring 11.

When the pulser ring 11 rotates together with the outer ring 2, electromotive forces are produced from the circumferentially arranged teeth 16. The sensor 4 picks them up to determine the number of revolutions of the wheel bearing 1.

With such a pulser ring, it is required that the pitch error of its teeth 16 as well as error of diameters of both rings be as small as possible. With the pulser ring 11 according to the present invention, the teeth 16 can be pressed from a single plate at one time. Each tooth 16 has its tip snugly fit in the respective groove formed between the adjacent protrusions on the inner ring. Thus the pitch error of the teeth 16 is reduced to a minimum. Moreover, since the inner ring 12 and the outer ring 13 are formed into cylinders by pressing, the precision of diameters of both rings will be improved, thus increasing the detection accuracy.

What is claimed:

1. A pulser ring comprising an inner ring made from a steel plate, and an outer ring made from a steel plate, said inner ring being formed at one end thereof with a plurality of protrusions equally angularly spaced therebetween and extending radially outwardly, said outer ring being formed with a plurality of teeth arranged with equal angular spacings so as to extend axially, said outer ring being fitted on said inner ring with said teeth on said outer ring held in grooves formed between said protrusions on said inner ring, the tips of said teeth bent inwardly against the end of said inner ring to couple said outer ring with said inner ring.

* * * * *